United States Patent [19]

Goldman

[11] Patent Number: 4,476,468

[45] Date of Patent: Oct. 9, 1984

[54] SECURE TRANSACTION CARD AND VERIFICATION SYSTEM

[75] Inventor: Robert N. Goldman, Kailua, Hi.

[73] Assignee: Light Signatures, Inc., Los Angeles, Calif.

[21] Appl. No.: 503,392

[22] Filed: Jun. 10, 1983

Related U.S. Application Data

[63] Continuation-in-part of Ser. No. 276,282, Jun. 22, 1981, Pat. No. 4,423,415.

[51] Int. Cl.³ .......................... H04Q 9/00; G06K 7/10
[52] U.S. Cl. .............................. 340/825.034; 235/468; 235/380
[58] Field of Search ........................ 340/825.34; 382/7; 235/380, 468, 469; 350/3.61, 378, 167, 374

[56] References Cited

U.S. PATENT DOCUMENTS

| 3,894,756 | 7/1973 | Ward | 350/3.61 |
|---|---|---|---|
| 4,014,602 | 3/1977 | Ruell | 350/3.61 |
| 4,143,810 | 3/1979 | Greenaway | 350/3.61 |
| 4,202,491 | 5/1980 | Suzuki | 235/468 |

FOREIGN PATENT DOCUMENTS 2553811  6/1977  Fed. Rep. of Germany ...... 235/468

Primary Examiner—Donald J. Yusko
Attorney, Agent, or Firm—Nilsson, Robbins, Dalgarn, Berliner, Carson & Wurst

[57] ABSTRACT

An identification card is disclosed as for supporting commercial or other significant transactions involving a designated subject. The card incorporates a machine-readable record and includes a composition to characteristically modulate a light beam for individual card identification. In one embodiment, the card incorporates light-changing crystals (e.g. polaroid) to modulate a light beam. The machine-readable record on the card indicates: the light beam modulation, a coded personal identification for the subject card bearer, and a time-related value criterion involving use for the card. Systems are disclosed for variously sensing card characteristics by modulated light including polarized light techniques and from different aspects.

A system for processing the cards is also disclosed including apparatus for sensing recorded signals representative of: a modulated light beam characteristic, a personal identification for the card holder, and a time-related use limitation. Computer structure is provided for comparing such signals with developed signals provided from the card and the user to verify that: the card is genuine, the user is proper, and the use is appropriate. A multiple-terminal system is disclosed wherein terminal inquiries are channeled to one of several processors for flexibility and reliability. The system incorporates apparatus for conditionally refreshing a card.

18 Claims, 13 Drawing Figures

SECURE TRANSACTION CARD AND VERIFICATION SYSTEM

RELATED SUBJECT MATTER

This is a continuation-in-part of U.S. Pat. No. 4,423,415 issued from an application Ser. No. 276,282 filed June 22, 1981, and entitled "Non-Counterfeitable Document System".

BACKGROUND AND SUMMARY OF THE INVENTION

In recent years there has been a consistent and gaining effort to establish a so-called "cashless society". One aspect of that effort has involved a steady increase in the use of personal devices, usually in the form of cards, to authorize or support various significant transactions. For example, cards are widely used as identification cards and transaction cards as employed for credit cards, debit cards, cash cards, value cards, and banking cards. Classifications and definitions are sometimes ambiguous and volatile.

Although various card structures have been proposed in the past, along with various forms of processing systems, a need continues to exist for a reliable, economical, and practical transaction card along with a similarly effective system for processing such cards and regulating their use.

Many forms of transaction cards are used in environments where some opportunity exists to visually inspect the cards at the time of their use. For such applications, the requirements of an anti-counterfeitable card are rather different than those applications for a card where there is no opportunity for visual inspection, as in the case of automatic teller machines.

It has been proposed to verify a card by testing its translucency, as described in the specification of a U.S. Pat. No. 4,423,415 which was co-pending herewith, entitled "Non-Counterfeitable Document System". Under certain circumstances it may be feasible to make a counterfeit document to form signals similar to those of a genuine document, and thus perpetuate fraud. Essentially, such a fraud is easier to accomplish if the counterfeit document need not pass a visual inspection. Consequently, in applications as automatic-teller machines (cash dispensers) where transaction cards are not visually inspected, another dimension is added to the problem of detecting counterfeit cards. Accordingly, a need exists for an effective non-counterfeitable transaction card, the signals from which cannot be practically simulated for use in applications that do not necessarily involve visual inspection of the cards.

The card-related processing system of the present invention is based on recognition that transaction cards have three major vulnerabilities: the card might be the target of counterfeit efforts; the user of the card may not be the assigned user; or the card may be used in excess of the limits stipulated by the issuer.

Even though a transaction card may be genuine (not counterfeit) it might be mis-used by an unauthorized person. For example, the card presented to support a transaction may have been stolen or lost with the consequence that a resulting transaction will likely involve a loss.

Also, even though a card is genuine and is presented by the assigned user, there remains some risk that the user may exceed the level of his financial abilities. For example, an assigned card holder may experience financial reverses or other catastrophic circumstances which impact upon his financial situation and cause him to become irresponsible. Accordingly, a need exists to monitor the use of a transaction card and thereby limit exposure to the card-issuing entity.

In general, the present invention is based on recognizing the above considerations and implementing cooperative elements to afford an effective, economical, and practical transaction card for use in combination with an effective card processing system. Particular concern is with cards that are contemplated for use without visual inspection.

The disclosed embodiment, in accordance with the present invention, incorporates a card in sheet form, with a reference medium having a random variable pattern to modulate a beam of light applied to the sheet as when the beam scans an area of the sheet. The light beam so modulated generates a pattern unique to each specific card. The pattern is quantized and converted to a digital representation. This representation is recorded on the card in a machine-readable form along with other machine-readable data specifically including a personal identification number for the assigned holder of the card and a time-related use limitation imposed on the card to support transactions. With such information, the system tests the related criteria to determine the acceptability of the card for a specified transaction. In a network configuration, the system may distribute authorization processing. The system also incorporates elements for refreshing the card after an acceptable use.

As disclosed in detail below, the card and related system hereof may be variously implemented using different media and different techniques. For example, the card may be constituted of different light-modulating materials (e.g. paper, crystalline film). Also, the record signals on a card may be variously recorded. Additionally, the processing system may be variously implemented for different applications and for various design and policy considerations. Of course, the transaction card may be implemented for different functions including credit cards, debit cards, identification cards, access cards, and decrementing cards.

BRIEF DESCRIPTION OF THE DRAWINGS

In the drawings, which constitute a part of this specification, exemplary embodiments of the invention are set forth as follows.

DESCRIPTION OF THE ILLUSTRATIVE EMBODIMENTS

As indicated above, detailed illustrative embodiments of the present invention are disclosed herein. However, physical identification media, crystalline-type layers, data formats, and operating systems structured in accordance with the present invention may be embodied in a wide variety of different forms some of which may be quite different from those of the disclosed embodiments. Consequently, the specific structural and functional details disclosed herein are merely representative; yet in that regard, they are deemed to afford the best embodiments for purposes of disclosure and to provide the basis for the claims herein which define the scope of the present invention.

Figure 1:
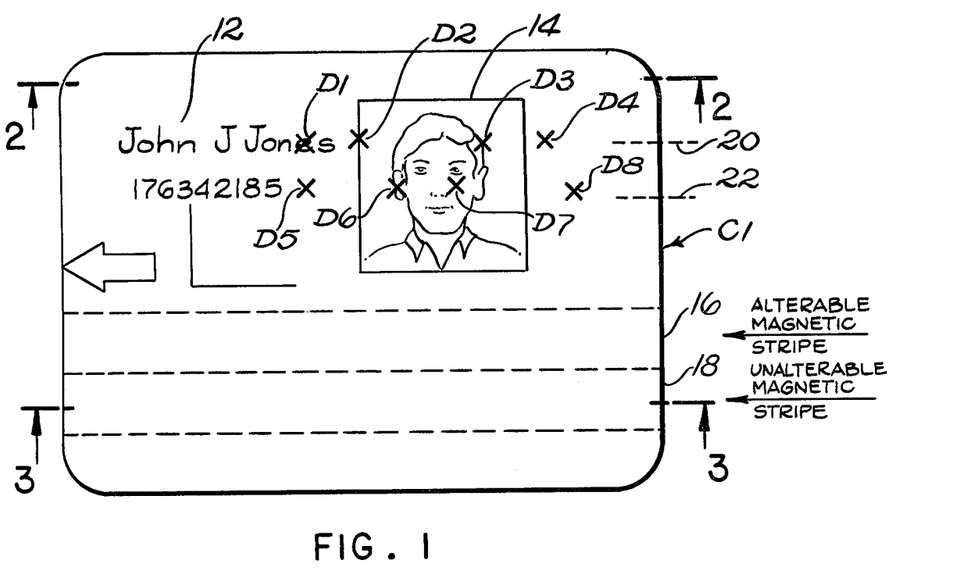
FIG. 1 is a plan view of a card in accordance with the present invention implemented for use in a system in accordance with the present invention.

Referring initially to FIG. 1, a card C1 is illustrated which, as explained below in detail, is relatively secure in use to support transactions as described herein. The card C1 could be adapted for use to support any of a variety of transactions. For example, the card C1 might be presented in a commercial establishment as a basis for making a credit purchase. Other contemplated uses for forms of the card include personal identification, entry control, financial commitment identification or any of a variety of other transactions involving the need for identification and approval.

The card C1 incorporates structure as a basis for the performance of three related tests. Specifically, as one test aspect, the card C1 has an identifying individual characteristic structure. It is assigned for use by a subject or person who is identified by a private, personal identification number. The combined identifications of the card and its assignee are associated with data for imposing predetermined use limits on the card. Each of these criteria, involving the structure of the card, the personal identification number of the user, and the limitation on use, is manifest by the card in a machine-readable form so as to facilitate testing the card upon presentation for a particular transaction.

Considering the card C1 in somewhat greater detail, it carries print 12 (upper left) indicating the name of the assigned holder along with his photographic likeness 14 (right). The print and the likeness 14 may be variously deposited or printed on a sheet of bond paper 15 (FIG. 2) which constitutes the base of the card C1.

Generally, the print 12 and the likeness 14 alter the translucency of the bond paper 15 at certain specific areas. Such altered states become part of the identification standard. In general, overlays, erasures, or other modifications of the print 12 or the likeness 14 will tend to further alter the light transmission properties of the paper 15 at the points of alteration. Such changes may be detected mechanically as disclosed below.

In accordance herewith, the translucency at predetermined areas (including some on the print 12 or the likeness 14) is sensed and provided as a digital record for authenticating the individual card C1. The sensing and recording operations may be as disclosed in copending application Ser. No. 276,282 entitled "Non-Counterfeitable Document System" or alternatively as disclosed below. In any event, indications of the translucency (or various other random characteristics as capable of modulating electromagnetic radiation) are recorded on the card in a form that is machine readable. Specifically, with regard to the card C1, the verification data for identifying the card C1, the personal identification data on the assigned user, and data on the limit of use allowable for the card are all recorded on a pair of magnetic stripes 16 and 18 of the card C1.

Each of the stripes 16 and 18 is self-clocking as well known in the art; however, in operation the two stripes are quite different. Specifically, the stripe 16 is a so-called "alterable" magnetic recording medium which can be effectively sensed and recorded using somewhat standard equipment. On the contrary, the magnetic stripe 18 is termed "unalterable" and, accordingly, is not susceptible to re-recording without complex and expensive apparatus.

To generally consider the use of the card C1 by an assigned person, an initial confirmation of the holder's identification might be made simply by visually comparing the likeness 14 on the card with the holder's physical appearance. The card C1 would then be checked by an apparatus constructed in accordance with the present invention to mechanically sense and check the resulting data as described in detail below. Generally, the sensing is performed by scanning the card horizontally along several paths for certain data. Specifically, the card C1 is scanned by a penetrating light beam for multiple-level translucency scale readings along the dashed line paths 20 and 22. Note that depending on the construction of the card C1, a window (not shown) may be defined for variously exposing the bond paper 15 to modulate impinging light. The modulated signals of the penetrating light indicate a characteristic for the bond paper 15. At certain points, the character of the paper is sensed in combination with the print 12 or the likeness 14.

The card C1 also is scanned along the magnetic stripes 16 and 18 to sense magnetically recorded test data. The data from the magnetic stripes designates selected locations (equatable to modulation signal samples) along the paths 20 and 22 for test observations. The magnetic stripe data also indicates the personal identification number for the assigned user and the limits specified by the user for use of the card.

Considering the structure of the card C1 in somewhat greater detail, the full area of the card is occupied by a sheet of bond paper 15 (FIGS. 2 and 3) and a pair of external, clear plastic sheet laminates 28 and 30. If the laminates are not clear, as indicated above, windows may be included at areas of the paths 20 and 22. In general, techniques for the production of laminate identification cards incorporating magnetic stripes, as the stripes 16 and 18, with bond paper are well known.

Turning to the data format of the card C1, scanning the paths 20 and 22 involves sensing the translucency of the bond paper 15 along these paths by intensity modulating a light beam. As indicated in the referenced patent specification, the variations in translucency of bond paper can be easily seen by holding a sheet up to a bright light and looking through the sheet. In the initial processing of the card C1, such variations at specific locations, i.e. D1, D2, D3, D4, D5, D6, D7, and D8 are sensed and recorded. Note that the locations D1, D2, D3, and D4 are along the path 20 while the locations D5, D6, D7, and D8 are along the path 22. Essentially, the paths 20 and 22 are concurrently scanned by sensing light which penetrates the card C1 and is accordingly modulated.

A pair of signals representative of the two paths 20 and 22 are sequenced into a single serial signal which is sampled at times to select the locations D1, D2, D3, D4, D5, D6, D7, and D8. Such sampled values are then quantized and digitized to form a digital signal RCT. A characteristic digitally representative signal RCT is thus formed which is magnetically recorded on the card C1 along with designations of the data locations D.

To verify a card, the data locations D are freshly sensed (same manner as before) and a digital representation is formed, specified as a signal CT. The value of the signal CT is compared with the previously sensed, recorded signal RCT from the unalterable magnetic stripe 18. In that manner, the card C1 is identified by comparing its actual or modified fiber structure characteristic as currently observed with the same characteristic as previously observed.

The verification of the card itself constitutes a major test. Two other major tests involve verifying the user of the card and testing the proposed use of the card. Both tests involve the provision of external data at the scene of the test, as from a keyboard.

In general, the user of the card is verified by his formation of identifying signals as, for example, signals representative of his personal identification number. Note that techniques and apparatus for securely recording personal identifications, as by scrambling, are disclosed in U.S. Pat. Nos. 3,609,690 (Niseman et al.) and 3,938,091 (Atalla).

Testing the propriety of an actual contemplated transaction may be performed by relating certain transaction-indicating signals (as from a keyboard) with time-related control signals from the magnetic stripe 16 and specifying limits of use.

Before proceeding with the description of operations in greater detail and for convenient reference, the signals and signal names developed in the disclosed embodiment in association with use of the card C1 are set forth below in chart form:

| Chart 1 | |
|---|---|
| Signals | Signal Name |
| Keyboard Source | |
| Input PIN | IPIN |
| Request | |
| Cash withdrawal | CW |
| Amount of cash | AC |
| Alterable magnetic stripe 16 | |
| Last use (date) | LS |
| Last use, encoded (date) | ELS |
| Weekly limit, encoded | WL |
| Balance of limit, encoded | EBL |
| Recorded PIN, encoded | RPIN |
| Card number, encoded | ENR |
| Unalterable magnetic stripe 18 | |
| Card number | NR |
| Card number, encoded | ENR |
| Characteristic, encoded | RCT |
| (including data locations) | |
| Characteristic card paths 20, 22 | |
| Characteristic, sensed | CT |
| Computer System Source | |
| Decoded last use | DLS |
| Decoded PIN | DPIN |

| -continued | |
|---|---|
| Chart 1 | |
| Signals | Signal Name |
| Decoded weekly limit | DWL |
| Decoded balance of limit | DBL |
| Current date | CD |
| Decoded characteristic | DCT |
| Decoded card number | DNR |
| Proposed total value | PT |

In the above list, data is classified with respect to different sources within the system. Certain data is provided manually by the user activating a keyboard. Other data is provided from the card C1, specifically from the stripes 16 and 18 as well as the paths 20 and 22. Finally, certain data and related data signals are developed or originated within the computer system performing the testing process.

Prior to considering the disclosed embodiment for processing the illustrative card C1 for approval of a transaction, some summary and recapitulation of the operations performed on specific data signals will be helpful.

To perform the approval tests, comparative operations are performed with respect to specific signals. The card-identifying characteristic data previously sensed from the paths 20 and 22 of the card and recorded on the stripe 18 is designated as the signal RCT. In one test, the characteristic signal RCT from the magnetic stripe 18 is compared with the freshly sensed characteristic signal CT sensed sequentially from the card paths 20 and 22. In that manner, the authenticity of the card itself is verified.

To verify the user of the card, a keyboard is actuated to develop a personal identification number as represented by a signal IPIN (input). That signal is compared with a similarly representative signal from the magnetic stripe 16 as previously recorded to indicate the personal identification number, i.e signal RPIN (recorded). The personal identification number (presumably known only to the card user) thus confirms the identity of the user. Note that in accordance with prior-art techniques and known operating methods, the recorded personal identification number is encoded or scrambled and, accordingly, must be decoded to provide a signal DPIN (decoded) before performing actual comparisons.

Along with the verification of the card and the verification of the user, in accordance herewith, it is also important to test the transaction in question. Using a keyboard, the user forms signals indicating his request, specifically for example, a cash withdrawal command (signal CW) and a specification of the amount of cash (signal AC). These signals are correlated to the date of the current request (current date signal CD), the weekly limit for cash withdrawals (weekly limit signal WL), and the existing balance of that limit (balance of limit signal BL). Thus, the contemplated transaction is tested.

It is important to recognize that all three of the correlated tests involve reference to data that is carried on the card itself. Consequently, in the disclosed embodiment, the tests are independent of any comprehensive data bank.

In the event that the inter-related tests are affirmative, essentially approving a contemplated transaction, the transaction is commanded and the card C1 is refreshed to reflect the transaction. Consequently, the card is repeatedly updated and refreshed with time and use. Accordingly, a durable, effective, inexpensive, and relatively safe card system with off-line capability is provided.

Figure 4:
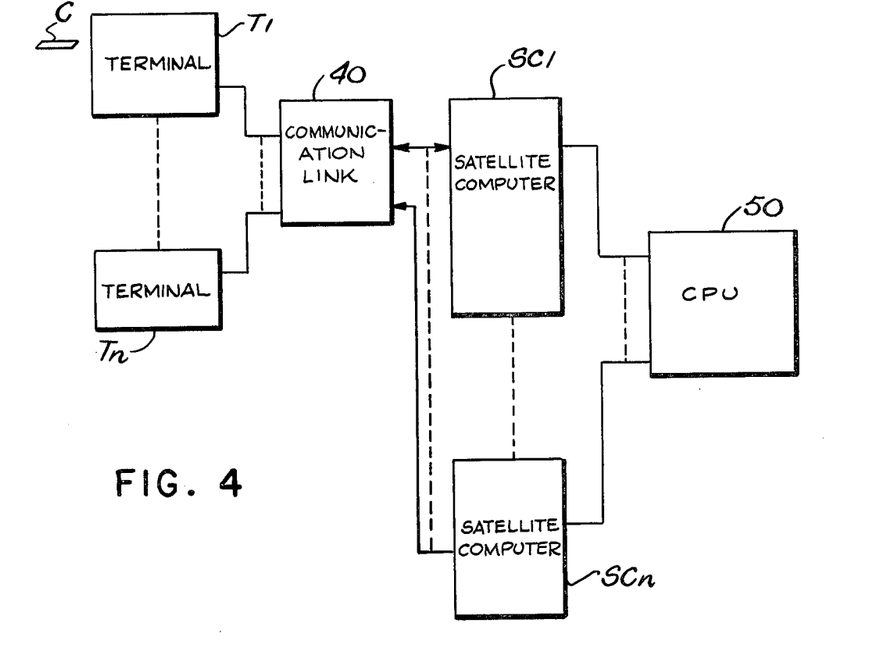
FIG. 4 is a block diagram of a system constructed in accordance with the present invention.

Consideration will now be directed to the system of FIG. 4 to explain the performance of the inter-related test operations at a multitude of terminals that may be distributed over a large inter-linked area, as for example, on a national scale. In the system, individual cards C are used at terminals T1 through Tn which are connected through a communication link 40 to a series of satellite computers SC1 through SCn. Of course, the communication link 40 may comprise telephonic data connections. Thus, any of terminals T1 through Tn may be associated with any of the satellite computers SC1 through SCn to process a particular inquiry. The satellite computers SC1 through SCn are also connected to a central processing unit 50.

In the operation of the system as illustrated in FIG. 4, a card C (upper left) in accordance herewith may be presented at any one of the terminals T. As illustrated, the card C is sensed at the terminal T1 and the data therefrom is provided through the communication link 40, for example, to the satellite computer SC1. In the event that the satellite computer SC1 is inoperative, busy, or otherwise disqualified, the inquiry may be referred from the satellite computer SC1 to another of the satellite computers SC in the system.

A satellite computer SC which accepts an inquiry performs the tests to determine the genuine nature of the card C, the propriety of the card user, and the propriety of the proposed use. The satellite computer SC then returns signals (through the communication link 40) to the inquiring terminal T1 to approve or reject the contemplated transaction.

Generally, the satellite computers SC operate substantially independently from the central processor (CPU) 50; however, periodically the satellite computers SC may be provided supplemental information as, for example, a negative list indicating cards C that are to be rejected as having been canceled, lost, or stolen.

Figure 5:
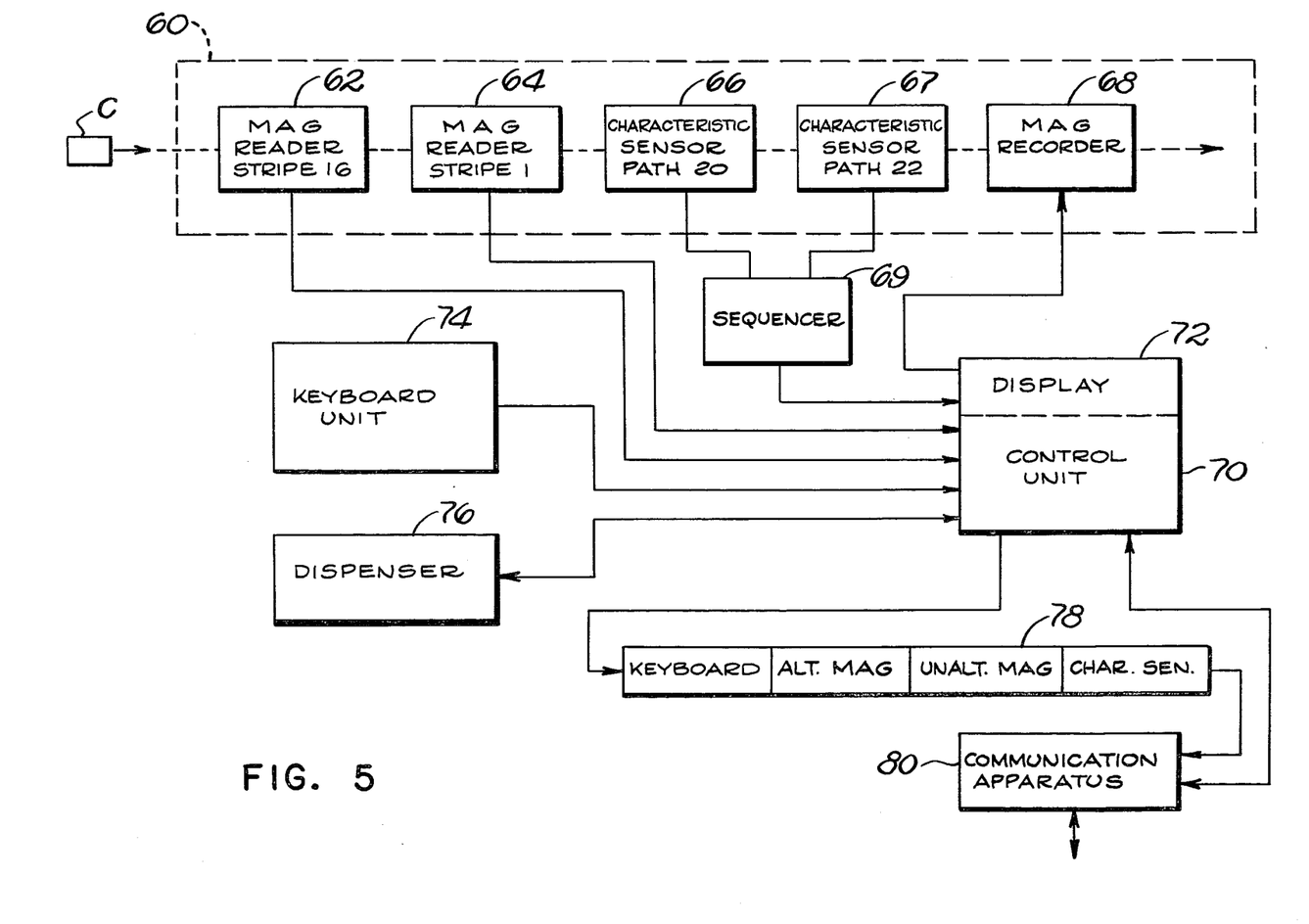
FIG. 5 is a block diagram of a terminal unit as illustrated in FIG. 4.

Pursuing the system of FIG. 4 in somewhat greater detail, consider the terminals T1 through Tn. Essentially, the terminals T are all similar and function to formulate a collection of signals to manifest details of a contemplated transaction. An exemplary form for the terminals is illustrated in FIG. 5 and will now be considered.

The card C (FIG. 5 upper left) is received within the terminal T by a transport mechanism 60, various forms of which are well known in the prior art for handling magnetic cards. The transport mechanism 60 moves the card C for cooperation with several transducer structures as illustrated. Specifically, the card C is passed through magnetic readers 62 and 64 (illustrated as separate units), then through characteristic sensors 66 and 67, and finally through a magnetic recorder 68.

The magnetic readers 62 and 64 sense the two magnetic stripes 16 and 18 of the card C (FIG. 1). The characteristic sensors 66 and 67 sense the card along paths 20 and 22 to provide representative characteristic signal components which are sequenced in a sequencer 69 to provide a unitary analog signal for selective sampling.

The magnetic recorder 68 functions in cooperation with the alterable magnetic stripe 16 to re-record the stripe (conditionally) using techniques which are well known and in widespread use. The recorder 68 is activated with the approval of a transaction.

The readers 62 and 64 along with the sensors 66 and 67 are coupled to a control unit 70 as well known in the prior art and which incorporate a display 72. Embodiments of the control unit 70 are in widespread use in apparatus generally known as cash dispensers or automatic tellers. Fundamentally, the control unit 70 correlates data C for submission to a computer. The display 72 instructs a user in the use of a keyboard unit 74. In the cash dispenser application, the control unit 70 also actuates a dispenser 76.

A composite set of signals constituting the data for an inquiry is formulated by the control unit 70 and assembled in a register 78. The control unit 70 controls the register 78 for communication with a communication apparatus 80 which comprises a component of the communication link 40 (FIG. 4).

In view of the above preliminary description of the structure of FIG. 5, a comprehensive understanding of the terminal operation may now best be understood by assuming certain circumstances related to the use of the terminal and pursuing the operating circumstances attendant an exemplary use. Consequently, assume that the card C (FIG. 5) constitutes a money card and that it is placed in the transport mechanism 60 by the assigned user of the card with the objective of receiving a specific amount of cash. The card C is actuated by the transport mechanism 60 to be sensed and read formulating the signals as set forth in the above Chart 1. Specifically, signals are formed by reading the magnetic stripes 16 and 18 as well as sensing the card paths 20 and 22. Note that while the magnetic readers 62 and 64 and the characteristic sensors 66 and 67 are illustrated to sense the card in sequence, these units may well function concurrently. In any event, with regard to the sensors 66 and 67, the two analog signals provided are sequenced by the sequencer 69 to provide one continuous analog signal somewhat similar to a raster scan of the paths 20 and 22. That analog signal is sampled and digitized as disclosed in the above-referenced patent specification, "Non-Counterfeitable Document System".

The sensing of the card C prompts the control unit 70 to instruct the user (through the display 72) to actuate the keyboard 74. Specifically, the user indicates his personal identification number (PIN) to formulate a representative input signal IPIN. The user also specifies a request for cash withdrawal formulating the signal CW and specifies an amount of cash as represented by a variable signal AC.

The signals from the keyboard unit 74 and the card C are processed (in digital form) through the control unit 70 into the register 78. Essentially, the signals are registered as a data group representing the keyboard input, the magnetic stripe data and the card characteristic as sensed. Thereafter, the register 78 is cleared to the communications apparatus 80 formulating an inquiry to a satellite computer SC, e.g. satellite computer SC1 (FIG. 4).

The processing operations at the satellite computer involve testing the information provided from the user and his card to determine the likely risk that is involved in dispensing the requested cash. The inquiry is resolved as either being accepted or rejected. The representative response signals are supplied through the communications apparatus 80 (FIG. 5) to the control unit 70. If the request is accepted, the control unit 70 actuates the dispenser 76 to dispense the requested amount of cash. Concurrently, the control unit 7 actuates the magnetic recorder 68 to refresh the magnetic stripe 16 as described in somewhat greater detail below.

If the requested transaction is not approved, the dispenser 76 is not actuated. Rather, the display 72 simply provides an appropriate message of refusal. The occurrence of the refusal may or may not be noted on the card C by the magnetic recorder 68 in accordance with various operating considerations.

On receiving inquiry signals from a terminal T, the accepting satellite computer SC1 (FIG. 4) performs a sequence of test operations to determine the acceptability of a specified transaction. Preliminary to considering an exemplary detailed embodiment of the satellite computer structures, some analysis of the tests will be helpful. A pair of tests are performed to check for tampering with the magnetic record of the card. Specifically, the encoded date of last use of the card as manifest by the last use signal ELS is decoded to provide the signal DLS which is compared with the unencoded date of last use signal LS also sensed from the alterable magnetic stripe 16. Accordingly, the operations are as follows:

Decode ELS to form DLS—compare DLS with LS for identity.

Coincidence tends to indicate the integrity of the magnetic record.

As another preliminary test for a similar purpose to the bove, the unencoded card number is compared with the encoded card number after decoding. These values are sensed from the unalterable magnetic stripe 18 as a signal NR representing the card number and a signal ENR representing the encoded card number. The encoded card number is decoded to provide the signal DNR which is then compared with the unencoded card number. The operations are as follows:

Decode ENR to form DNR—compare DNR with NR for identity.

Turning to the substantive test operations, testing the identity of the user involves checking the personal identification numbers. Specifically, the input personal identification number keyed into the system by the user is identified by the signal IPIN. That signal is compared with the recorded personal identification number, after decoding from the magnetic stripe 16. Note that the recorded personal identification number manifest by the signal RPIN is encoded and must be decoded to a form as manifest by the signal DPIN prior to actual comparison. Complete coincidence is a necessary condition to approval of the request. The operations may be summarized as:

Decode RPIN to form DPIN—compare DPIN with IPIN for identity.

To verify a card, its structural characteristic (as freshly observed) is compared with the recorded characteristic. That is, the characteristic of the card is observed by sensing the card along the paths 20 and 22 (FIG. 1) then processing the resulting signals to formulate the digital characteristic as manifest by the signal CT. The recorded encoded card characteristic is sensed from the magnetic stripe 18 and is manifest by the signal RCT. After decoding the signal RCT to provide the decoded characteristic signal DCT, comparison is made with the signal CT manifesting the characteristic. This comparison may be satisfied by less than total coincidence to accommodate sensing and characteristic variations that may occur. Thus, less than total coincidence is normally required. The operation is summarized as:

Decode RCT to form DCT—compare DCT with CT for similarity.

The final test involves the propriety of the proposed use within the confines of established time and value limits. Specifically, in the disclosed embodiment, the system regulates the use of the card to support an accumulative value of transactions that is limited during a specific period. For example, a card holder may be limited to withdraw a specific amount of cash during a month, week, or other period. Essentially, the operation involves maintaining a balance of the user's periodic accumulation recorded on the card along with the user's specific limit. The limit is tested against the balance supplemented by the amount of the contemplated transaction. If the established limit for the present period is exceeded, the requested transaction is rejected. If the limit is not exceeded, the transaction is approved and the card is updated. The operation may be summarized as follows:

Test decoded last use DLS against current date CD—if card not used in present period approve, otherwise, continue—decode balance BL and amount of cash AC to form DBL and DWL—arithmetically combine current balance limit DBL with amount of cash AC to form proposed total value PT—test DWL to accommodate PT.

Figure 6:
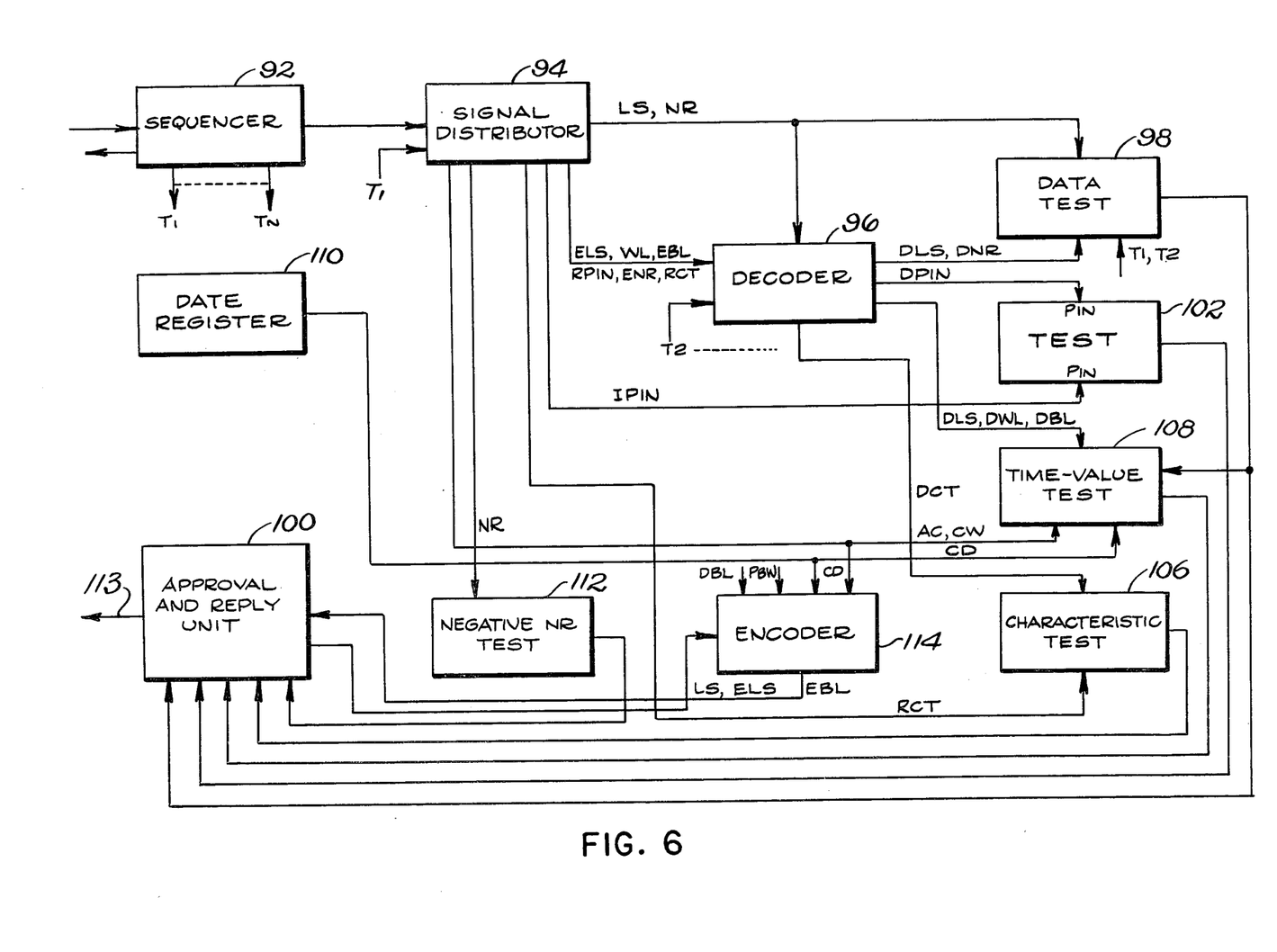
FIG. 6 is a block diagram of a satellite computer as illustrated in FIG. 4.

An exemplary implementation of a satellite computer SC as illustrated in FIG. 4 for performing the operations as disclosed above is represented in FIG. 6. Considering the implementation of FIG. 6, information is received at each of the satellite computers by a sequencer 92 (upper left). The sequencer 92 functions with the communication link 40 (FIG. 4) accepting or referring inquiries and additionally sequencing the test operations performed on inquiries accepted by the system.

With the acceptance of an inquiry, the sequencer 92 supplies a set of the data inquiry signals to a signal distributor 94 from which the separate information signals are provided on separate lines. Specifically, the signal NR (card number) and LS (representative of the encoded last date of use) are supplied from the distributor 94 directly to a test circuit 98. A decoder 96 receives the encoded signals ELS, WL, BL, RPIN, ENR, and RCT from the distributor 94.

The decoder 96 may take a variety of forms as well known in the art for decoding each of the received signals and supplying the decoded representative signals on separate lines. Normally, each of the satellite computers in the composite system will employ different cryptographic algorithms, at least for the encoded characteristic signals RCT.

The decoder 96 provides the signals DLS (representative of the decoded date of last use) and DNR (representative of the decoded card number) to the test circuit 98 for comparison with the last use signal LS and the card number signal NR. The dual test involves a verification of data and is performed solely for that purpose. Note that the dual test may be phased as by timing signals T1 and T2 which are provided from the sequencer 92 to time operations as well known in the art. Upon a favorable comparison, the test circuit 98 provides an approval signal to an approval-and-reply unit 100 which approval is correlated as part of the data to develop a response.

The decoder 96 also provides a signal DPIN (representative of the decoded personal identification number) to a test circuit 102. A signal IPIN (representative of the input personal identification number) also is supplied to the test circuit 102, provided from the signal distributor 94. The test circuit 102 tests for an identity between the value represented by the signal IPIN and that represented by the signal DPIN. In the event of identity, an approval signal is provided to the approval-and-reply unit 100.

Another test involves comparison of the decoded card characteristic DCT and the sensed card characteristic RCT. The signals DCT and RCT are supplied to a test circuit 106 (lower right) respectively from the decoder 96 and the distributor 94. The comparison performed by the test circuit 106 does not require total coincidence but rather a satisfactory degree of coincidence as explained in the referenced patent specification, "Non-Counterfeitable Document System". With such a degree of coincidence, a signal is provided from the test circuit 106 to the approval-and-reply unit 100.

As a final test, the system checks the user's cumulative transactions in relation to his weekly limit. Note that this test is conditioned somewhat on the use of the card during the past seven days (time-value period). If the user has not used his card during the current period, the amount of value to be tested is simply the amount of the proposed current transaction.

The value-time test circuit 108 receives the decoded signals DLS, DWL, and DBL from the decoder along with the signals AC and CW from the distributor 94 and the signal CD from a date register 110.

Essentially, if the card has not been used in the past seven days, the time-value test simply compares the current transaction (amount of cash) as manifest by the signal AC, with the account weeky limit as manifest by the signal WL. Of course, the initial test involves a comparison of the instant date manifest by the signal CD and the date of last use on the card as manifest by the signal DLS in Julian formats. If the last use is more than seven days prior to the current use, the value of signal AC is tested against that of signal DWL. With a favorable comparison, an approval is provided to the approval-and-reply unit 100.

If the card has been used in the seven-day period, an accumulative value is tested. The test circuit 108 then performs a value comparison. The current transaction, as represented by the signal AC is arithmetically combined with the balance of limit as manifest by a decoded balance limit signal DBL. The resulting accumulative value is then tested against the decoded weekly limit as represented by the signal DWL. Detailed structures for performing such tests are disclosed in U.S. Pat. No. 3,610,889 (Goldman). In the event the limit has not been exceeded, a signal is provided from the test circuit 108 to the approval-and-reply unit 100.

A further test, which is somewhat independent of the inter-related tests as described above, involves testing the number of the card as manifest by the signal NR against a negative list of cards specified as bad. Such negative cards may have been lost or stolen. The comparison is performed by a test circuit 112 incorporating memory capability to register a bad list. Unless the card number under consideration, as manifest by the signal NR, coincides with a number on such a negative list, the test circuit 112 provides an approval signal to the approval-and-reply unit 100.

In the event that each of the tests as indicated above produce favorable results, the approval-and-reply unit 100 delivers appropriate command signals. A command signal is provided from the unit 100 to an encoder 114 (FIG. 6, central) which formulates fresh signals representative of the current date DC as the new date of last use (signal LS). The encoder 114 also encodes that signal as the encoded date of last use (signal ELS) and forms fresh encoded balance of limit (signal EBL). Such signals are supplied from the encoder 114 to the approval unit 100 for return to the terminal where they are recorded on the magnetic medium of the card. The unit 100 provides these signals through the communication link 40 (FIG. 4) to the terminal T. A rejection signal is similarly supplied if the tests are not positive.

As indicated above, the step-by-step operation of the system of FIG. 6 is sequenced by the sequencer circuit 92. That is, in addition to controlling the accepted inquiries, the sequencer 92 produces a series of timing signals T1 through Tn. These signals are applied to the individual components (illustrated for some circuits) to sequence the operation in the performance of the individual tests as well known in the art. Accordingly, test operations as described above are performed to attain the comparisons and thereafter to develop appropriate signals for selectively actuating the inquiry terminal T (FIG. 5). Specifically, with the approval to the terminal T, the dispenser 76 and the magnetic recorder 68 are actuated. Accordingly, the cash is dispensed and the card is refreshed. Such operations are commanded by the system of FIG. 6 acting through the communication apparatus 80 as illustrated in FIG. 5.

From the above description, it may be seen that the system of the present invention affords a transaction card which offers relative security to the issuing organization. As explained, the card integrates related tests for verifying that: (1) the card is not a counterfeit, (2) the person attempting to use the card is the assigned user, and (3) the card is being used within predetermined limits involving time and value. The integrated tests afford considerable security in a card which is relatively inexpensive, durable in use, easily manufactured, and economical to produce.

Figure 7:
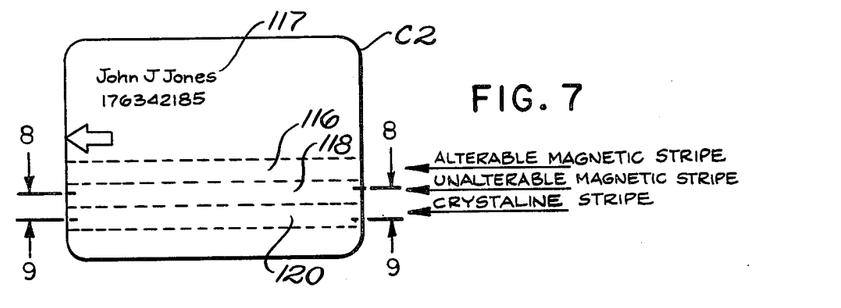
FIG. 7 is a plan view of another form of card embodying the present invention and implemented for use in a system in accordance with the present invention.
Figure 8:
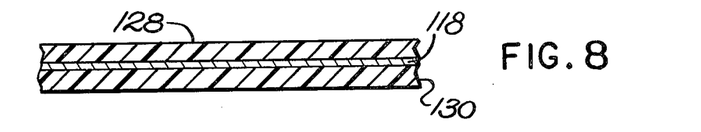
FIG. 8 is a sectional view taken along line 8—8 of FIG. 4.
Figure 9:
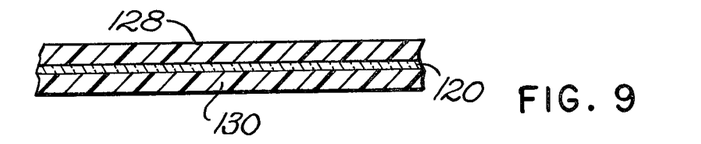
FIG. 9 is a sectional view taken along line 9—9 of FIG. 4.

In the system as described above, a card might be used to support a transaction without any direct inspection of the card by a teller or other person. In such a situation, the card may be more susceptible to counterfeiting as explained above. For use in such situations, another embodiment of a card in accordance herewith is disclosed as set forth below. Specifically, a so-called "blind-use" card C2 is illustrated in FIGS. 7, 8, and 9 and will now be described.

Figure 2:
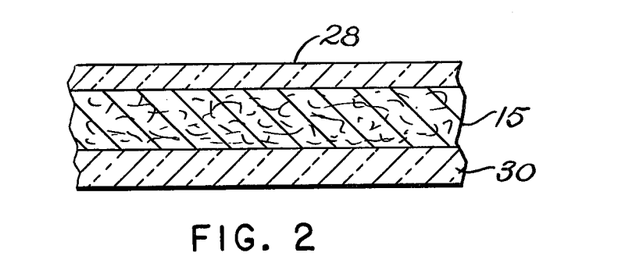
FIG. 2 is a sectional view taken along line 2—2 of FIG. 1.
Figure 3:
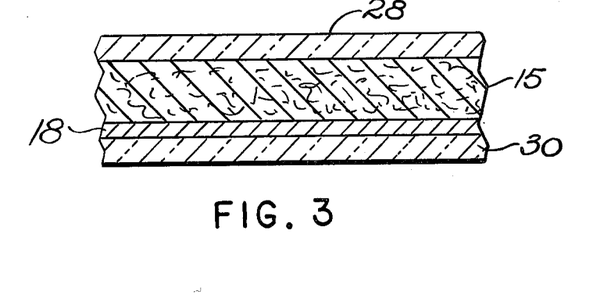
FIG. 3 is a sectional view taken along line 3—3 of FIG. 1.

The blind-use card C2 differs from the card C1 of FIGS. 1, 2 and 3 primarily with regard to the characteristic structure. The card C2 may operate effectively in the cash-dispenser system as described above in accordance with the present invention.

The card C2 may be void of any humanly perceivable indicia because it is intended for use primarily by machine processing. However, in the illustrative embodiment, the name and card number are indicated by the indicia 117. The indicia 117 may be variously deposited or printed on a sheet of bond paper 115 (FIG. 8). The card C2 also incorporates a pair of magnetic stripes 116 and 118. Specifically, as in the card C1, the stripe 116 is a so-called alterable magnetic recording medium which can be effectively sensed and recorded. The magnetic stripe 118 is unalterable and, accordingly, is not susceptible to re-recording without complex and expensive apparatus.

In addition to the stripes 116 and 118, the card C2 incorporates a crystalline stripe 120 (FIG. 7) which in one form of the disclosed embodiment comprises small crystals, the orientation of which affects the angle of polarization of plane polaroid light passing through them. The stripes 116, 118, and 120 are sandwiched between transparent plastic sheets 128 and 130 (see FIGS. 8 and 9). Accordingly, the stripe 120 (along its length) will variously modulate the angle of polarization of a plane polaroid beam of light. By thus passing the light through a polaroid filter, the modulated angle of plane polarized light can be converted to modulated intensity of light which in turn can be converted by a photocell array to a modulated electric voltage. Thus, the crystalline stripe 120 constitutes a form of orientation modulating medium for passing light.

In the above-described embodiment of the card C2, the crystal layer stripe 120 may comprise an arrangement of polaroid crystals somewhat as commonly used in polaroid sunglasses. As well known in that application, for a uniform or plane polarization of light, minute dichroic crystals (iodosulfate of quinine) are sandwiched as a thin film with the crystals aligned to accomplish the uniform polarization of transmitted light. The exemplary crystal stripe 120 in the card C2 takes a similar form, altered however, in that the dichroic crystals are not aligned but rather are randomly disposed. It is such random distribution that gives each of the cards an individual modulating characteristic.

In an alternate embodiment of the card C2, the crystal stripe 120 may comprise minute crystals having the so-called "clockwise" or "counterclockwise" crystalline characteristic to modify polarized light. Sodium chlorate crystals possess such a characteristic as explained in substantial detail in a book entitled "Crystals and Crystal Growing" by Holden and Morrison, MIT Press, 1982. Such crystals, in a minute form, may be randomly disposed in a layer to provide the modulating stripe.

Essentially, the modulating stripe as used in devices of the present invention distinguishes efforts to counterfeit which directly duplicate the intensity of the modulated light or radiation. Accordingly, the modulating stripe of cards of the present invention modulate the orientation or frequency properties of the light, wherein such properties involve polarization, color, and phase but exclude intensity or amplitude. Cards, and the like, of this invention, regarding this structural configuration, include an orientation-frequency property modulating stripe or area as distinct from documents that simply modulate the intensity of light.

In the use of the exemplary card C2, the crystal stripe 120 modulates an orientation property of a light beam in accordance with the random distribution of minute crystals. Such modulation of light provides a characteristic light signal that would be exceedingly difficult if not impossible to accomplish with a counterfeit card made by photographic reproduction techniques. Frequency properties of modulation would offer similar difficulty.

The function of the stripe 120 is to randomly alter (modulate) an orientation-frequency property of light as a beam scans the stripe. Essentially, a beam of light is focused to pass through the stripe 120 as it moves relative to a sensor. A filter or selective sensor apparatus may be used, depending on the specific embodiment, to form an intensity modulated pattern for sensing.

In using various embodiments of the card C2, the characteristic sensor (FIG. 5) of a system would take a form somewhat different from that disclosed for use with the card C1 (FIG. 1). A characteristic sensor for use with embodiments of the card C2 (wherein the stripe 120 comprises an orientation-frequency property modulating medium) will be considered preliminarily with reference to FIG. 10.

Figure 10:
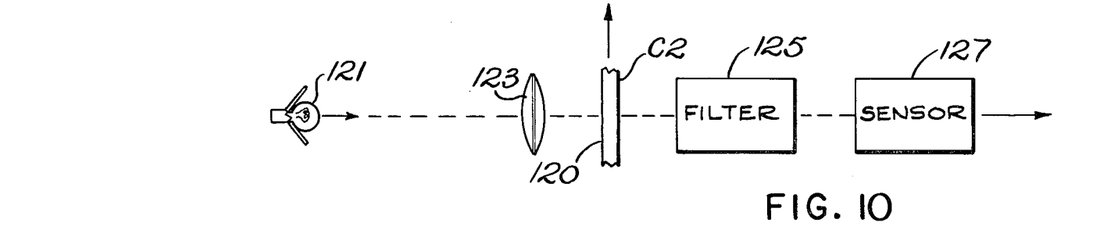
FIG. 10 is a diagrammatic view illustrating a technique as embodied in sensors of the present invention.

Referring to FIG. 10, a lamp 121 provides light that is focused by a lens 123 to scan the relatively moving card C2 along the stripe 120. Accordingly, light passing through the stripe 120 is a modulated beam which is applied through a filter 125 to a photosensor 127. In an embodiment wherein the stripe 120 varies such properties as light frequency or light orientation, the filter 125 functions with the sensor 127 to selectively sense light of the particular property, i.e. the modulated beam property defining the card characteristic. Essentially, the modulating stripe 120 and a cooperating filter 125 act to provide an intensity-modulated beam carrying the characteristic data. A document counterfeited to directly intensity modulate the light beam would probably be detected because the cooperating filter would tend to alter the inherently randomly polarized light beam.

Figure 11:
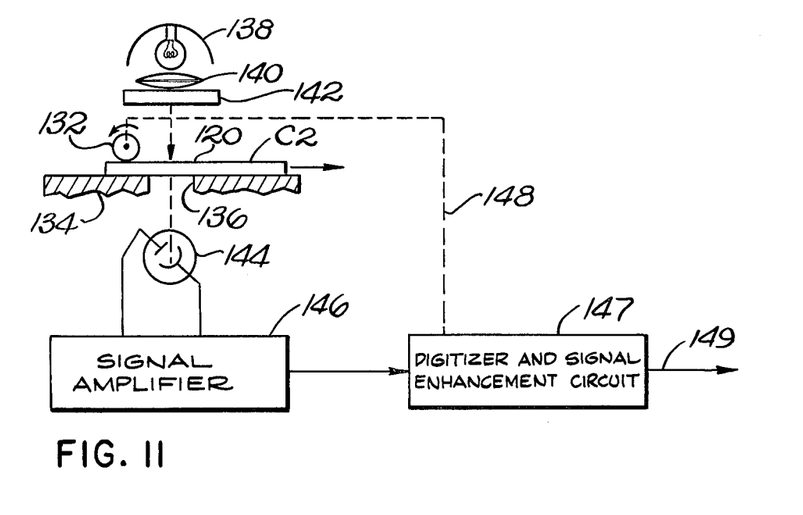
FIG. 11 is a diagrammatic view of one form of characteristic sensor as illustrated in FIG. 5 incorporating the principles of the present invention.

Of course, the apparatus for sensing the card characteristic may take a variety of forms, one of which will now be considered in relation to FIG. 11. A card C2 is actuated by a mechanical driver incorporating a roller 132 as well known in the prior art. The actuating apparatus moves the card across a platform 134 defining an aperture 136. A beam of light from a light source 138 is focused by a lens 140 and passes through a filter or polarizing element 142. Accordingly, a focused, plane polarized beam of light is projected on the crystal stripe 120 (FIG. 7) of the card C2 to be subjected to the modulating effect of the stripe 120. The stripe 120 polarity modulates the plane polarized light beam passing through the card C2 and impacting on a photocell 144. Of course, the resulting observed signal can be variously clocked in relation to motion of the card C2 or otherwise positionally related to card locations as disclosed in the referenced patent specification, "Non-Counterfeitable Document System". In that regard, a coupling is indicated between the roller 132 and a circuit 147 by a dashed line 148. Position signals may be developed accordingly as well known in the magnetics art.

Thus, the photocell 144 produces an analog signal representative of the polarity modulated light. The signal is amplified by an amplifier 146 and supplied to the circuit 147 to be enhanced and digitized. Enhancing relates to the fact that in use, cards embodied as cards C1 and C2, the plastic laminate sheets facing the cards are sometimes scratched or marred in a manner that may alter the characteristic representative signal as provided from the amplifier 146. Spurious content is introduced. With the use of computer-related signal enhancement, or image restoration techniques as known in the art, photographic processing spurious signal content is reduced in the circuit 147 which also samples, quantizes and digitizes the data to provide a digital output on a line 149.

In the operation of the sensor of FIG. 11, the beam of focused light emerging from the polarizing element 142 is essentially plane polarized. Consequently, the beam will be modulated by the stripe 120 of the card C2. For example, considering a crystalline layer, those polarizing crystals which essentially lie perpendicular to the plane polarized light beam will inhibit the passage of such light through the card. However, those crystals which are oriented in alignment with the plane polarized light beam will accommodate the passage of such light to actuate the photocell 144. Of course, crystals that lie in positions between such extremes will pass light accordingly. Consequently, a random arrangement of the minute dichroic crystals in the stipe 120 effectively modulates light passing through the card C2 and thereby provides a characteristic intensity signal to be developed by the photocell 144 amplified by the amplifier 146 and enhanced by the circuit 147.

Figure 12:
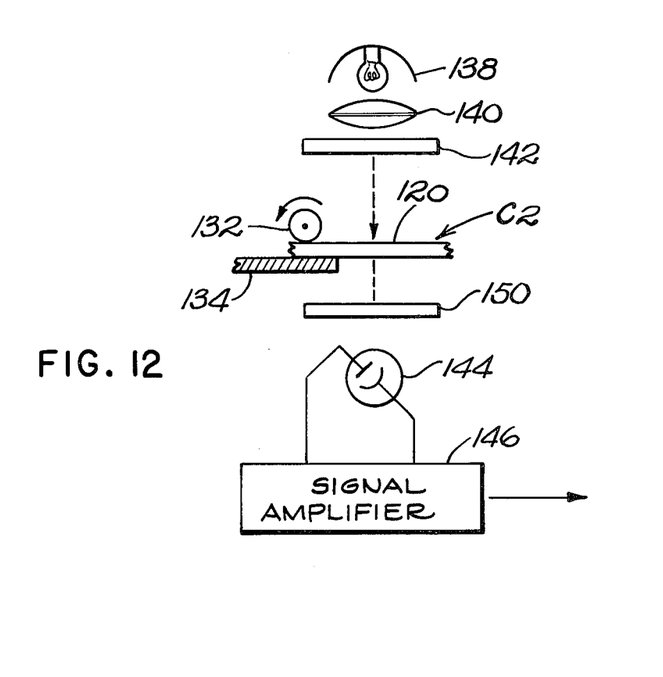
FIG. 12 is a diagrammatic view of a characteristic sensor comprising an altered form of that of FIG. 11.

As indicated above, in other embodiments of the card C2, the modulating stripe 120 may take different forms as a thin film of crystals exhibiting the clockwise or counterclockwise characteristic mentioned above. Such a layer accomplishes orientation modulation by variously twisting fragments of a plane polarized light beam to accomplish a randomly polarized beam according to the crystal distribution. Such a card form could be sensed by a sensor similar to that of FIG. 11, however, modified as illustrated in FIG. 12. The components of the system in FIG. 12 that are similar to components in FIG. 11 bear similar reference numbers. An additional element comprises another polaroid filter 150. In operation, the polaroid filter 150 converts the polarity-modulated beam emerging from the stripe 120 to an amplitude modulated beam for sensing by the photocell 144.

Of course, there are numerous other embodiments for sensors in accordance herewith wherein radiation is passed through a card to develop one or more beams that are modulated as with reference to orientation-frequency properties. Furthermore, for greater security, sensors may incorporate the duality of multiple-aspect sensing of the orientation-frequency modulating stripe. Considering such an embodiment, reference will now be made to FIG. 13 showing a sensor for a light-twisting modulation stripe.

Figure 13:
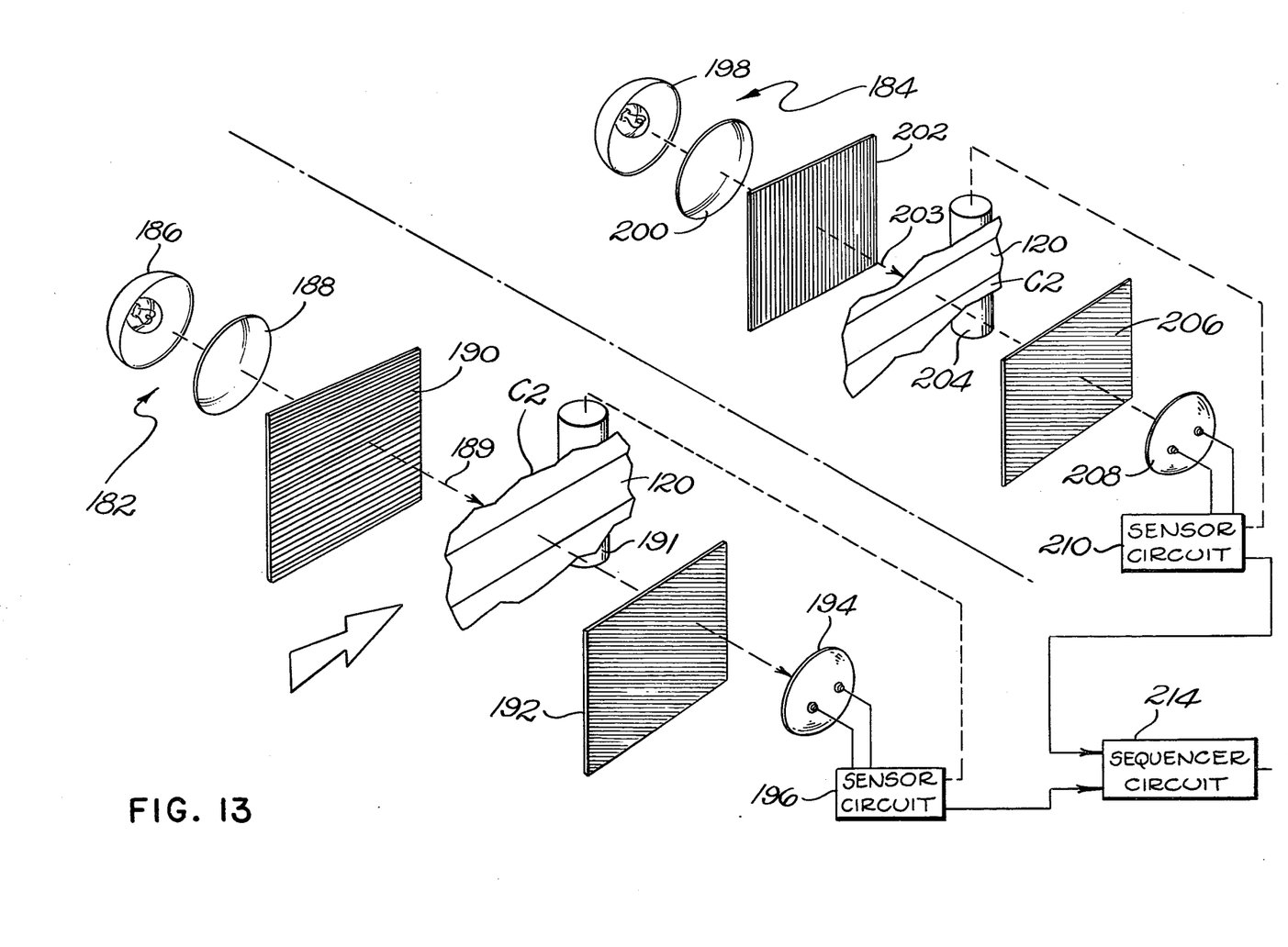
FIG. 13 is a diagrammatic view of another form of card characteristic sensor as illustrated in FIG. 5 incorporating duality principles of the present invention.

A pair of similar (but different) radiation scanners 182 and 184 are represented in FIG. 13. In the scanner 182, a lamp 186 provides radiation which is concentrated by a lens 188 into a beam. From such a beam, a polaroid filter 190 provides a plane horizontally polarized beam 189 as represented in FIG. 13. The plane polarized beam 189 passes through the stripe 120 of the card C2. Note that the card C2 is moved relative to the beam 189 by a transport mechanism including a roller 191. In that way, the beam scans the stripe 120 which, as suggested above, comprises sodium chlorate crystals in one embodiment which are randomly disposed in a layer. The individual crystals of the stripe 120 revolve, turn, or twist the plane polarized light of the beam 189 variously depending on their relative orientation. Consequently, the light passing through the stripe 120 is no longer plane polarized but orientation modulated by the crystals.

The modulated light impinges on a polaroid filter 192 which is disposed for plane polarization at an angle of about forty-five degrees offset from the horizontal. Consequently, only part of the polarity modulated radiation passes through the filter 192. Such select radiation provides intensity modulation that is sensed by a photo-element 194 coupled to a sensor circuit 196.

The scanner 184 is similar to the scanner 182 except that one of the polaroid filters is disposed to provide differently oriented plane polarization. The scanner 184 includes a lamp 198 which provides light through a lens 200 and a polaroid filter 202 to supply a plane polarized beam 203. Note that the filter 202 provides the polarized beam 203 which is vertically plane polarized as illustrated in FIG. 13 (angularly offset from the plane polarization of the filter 190).

The vertically plane polarized beam 203 passes through the stripe 120 of the card C2 as the card is moved by a transport including a roller 204. Thus, the stripe 120 is again scanned by transmitted radiation. However, as the impinging light beam 203 is polarized to a different angle, the radiation passing through the stripe 120 is quite distinct from that in the scanner 182.

The randomly polarized light emerging from the stripe 120 in the scanner 184 is screened by an angularly offset polaroid filter 206 then sensed by a photo-element 208 and a related sensor circuit 210. Note that while the filter 206 is oriented at a forty-five degree offset from vertical, similarly to the filter 192, the two filters provide distinct modulated light patterns because of the perpendicular offset of the initial filters 190 and 202. Consequently, a completely different characteristic is developed as the polarity modulated radiation, in spite of the fact that the scanners 182 and 184 both scan the same path on the stripe 120. Thus the system effectively distinguishes counterfeit cards as may have been designed to duplicate a characteristic photo-optically.

Essentially, the operation of the sensor system represented in FIG. 13 involves scanning a path on the stripe 120 from two different aspects facilitated by using offset plane polarized light beams. Each of the beams is modulated by the individual crystals in the stripe 120. However, because the polarity orientation of the two beams 189 and 203 is angularly offset, the random "twisting" of fragments of the beam passing through individual randomly oriented crystals produces two distinct orientation modulated radiation patterns. The two radiation patterns represent the character of the stripe 120 as viewed from two different aspects. A counterfeit card designed to modulate light (intensity) and hopefully duplicate a genuine characteristic would not provide the two-aspect distinction as explained above.

In the operation of the system of FIG. 13, the stripe 120 is scanned along substantially the same path by the scanners 182 and 184. The operations may be facilitated by alignments, recorded clocking as in the magnetic stripes, or field sensing with signal selectively. In that regard, the sensor circuits 196 and 214 are coupled to the rollers 191 and 204 respectively as indicated by dashed lines for positionally relating the observed signals to the card C2.

As indicated above, it is the nature of the randomly arranged crystals in the stripe 120 of FIG. 13 to revolve the plane polarized light passing through them. Consequently, while the beams 189 and 203 are plane polarized, when they emerge from the stripe 120, they are polarity modulated to indicate the character of the stripe 120 from two different aspects. Each radiation pattern might be considered as a bundle of rays with randomly varying polarization which bears relationship to the random orientation of the minute crystals in the stripe 120 and the plane polarity of the impinging beam.

The distinct radiation patterns are differently filtered by the polaroid filters 192 and 206. Consequently, distinct analog signals are provided from the sensor circuits 196 and 210. The two signals are processed and sequenced by a circuit 214 to provide a representative characteristic. Again, image enhancement and other techniques as well known can be used to improve performance.

From the above-described embodiments it can be appreciated that the stripe 120 can take a variety of different forms to orientation-frequency modulate a beam of light. Also, various forms of sensors can be used in cooperation with such stripes. Furthermore, cards bearing such stripes, as well as intensity modulation cards can be used in card processing systems as set forth herein.

In general, the system of the present invention affords an effective, durable and economical card that is relatively secure, as well as a related system for processing such cards to support significant transactions. Of course, as indicated above, cards and systems may be variously constructed to vary substantially from the specific details disclosed herein. Accordingly, the present invention is deemed to be limited in accordance with the claims as set forth below.

What is claimed is:

1. An authenticator device for machine sensing, as for use by a subject to indicate the prudence of a transaction in the subject's interest, comprising:
    a card in a sheet form and including a medium in at least a certain area thereof for altering an orientation-frequency property of light in a random variable pattern and accordingly to modulate the orientation-frequency property of a beam of light as said beam scans a path on said predetermined area of said medium; and
    a machine-readable record on said card indicative of said random variable pattern of said medium over said path on said predetermined area.

2. An authenticator device according to claim 1 wherein said predetermined area randomly alters the polarization property of light.

3. An authenticator device according to claim 1 wherein said sheet has indicia thereon to visibly identify said subject.

4. An authenticator device according to claim 1 wherein said machine-readable record comprises a magnetic record medium.

5. An authenticator device according to claim 4 wherein said magnetic record medium comprises an unalterable recording stripe and an alterable recording stripe.

6. An apparatus for light sensing an authenticator device including medium in a random pattern to modulate light with reference to an orientation-frequency property, comprising:
    a light source for providing a beam of light;
    means for moving said card in relation to said beam of light whereby said beam scans a predetermined path of said card to modulate said beam with reference to said orientation-frequency property;
    light filter means mounted to receive at least part of said modulated beam to filter said modulated beam with reference to said orientation-frequency property; and
    electro-optical means for sensing light of said modulated beam passing through said light filter means to provide a representative characteristic signal for said authenticator device.

7. An apparatus according to claim 6 wherein said orientation-frequency property comprises polarization.

8. An apparatus according to claim 6 wherein said electro-optical means includes image enhancement means for purifying said representative signal.

9. An apparatus according to claim 6 wherein said electro-optical means includes means to digitize said representative electrical signal.

10. A system comprising a pair of apparatus according to claim 6 and further including means to combine the representative characteristic signals from said electro-optical means in each of said pair of apparatus to provide a digital signal.

11. An apparatus according to claim 10 wherein said beams of said pair of apparatus intersect at a scanning location on said authenticator device.

12. A system according to claim 6 wherein said light filter means of said pair of apparatus are mounted to be on opposite sides of said device.

13. An authentication system for use by a person with an assigned card or the like to test verify that: the card is genuine, the user is proper and the use is appropriate, the card having a machine-readable record thereon and including a composition to modulate a light beam for identification, said system comprising:
    means for sensing said record of a card to provide a record light modulation signal for the card, a record personal identification number signal for the assigned person, and a record time-value use signal for the card;
    means for light sensing a predetermined portion of said card to provide a sensed light modulation signal for the card;
    means for a user to form an input personal identification number signal;
    means for a user to form a proposed use signal;
    means for testing: said record light modulation signal and said sensed light modulation signal, said record personal identification number signal and said input personal identification number signal, and said time-value use signal and said proposed use signal to provide an approval signal; and
    means for recording on said card a fresh record time-value use signal conditioned upon the provision of said approval signal.

14. An authentication system according to claim 13 wherein said means for light sensing includes at least one polaroid filter.

15. An authentication system according to claim 13 wherein said means for light sensing comprises an apparatus in accordance with claim 7.

16. An authentication system according to claim 13 wherein said means for testing said time-value use signal includes:
    time means for indicating a current time period;
    means coupled to said means for sensing said record for providing use-related signals and time-related signals indicative of a prior aggregate use of said card during a specified period of prior use of said card; and
    means coupled to said time means for processing said use-related signals and said time-related signals to provide approval signals upon a detection that the use of said card during said current period is within limited use.

17. An authentication system according to claim 13 wherein said means for sensing includes decoder means for decoding recorded signals.

18. An authentication system according to claim 13 wherein said means for testing includes means for testing said light modulation signals to approximate values.

* * * * *

UNITED STATES PATENT AND TRADEMARK OFFICE
CERTIFICATE OF CORRECTION

PATENT NO. : 4,476,468
DATED : October 9, 1984
INVENTOR(S) : Robert N. Goldman

It is certified that error appears in the above-identified patent and that said Letters Patent are hereby corrected as shown below:

Column 8, line 68, "7" should be --70--;

Column 9, line 28, "bove" should be --above--;
line 28, "wit" should be --with--; and Column 18, line 46, "7" should be --6--.

Signed and Sealed this

Second Day of April 1985

[SEAL]

Attest:

DONALD J. QUIGG

Attesting Officer     Acting Commissioner of Patents and Trademarks